United States Patent
Nagaraj et al.

(10) Patent No.: US 8,229,398 B2
(45) Date of Patent: *Jul. 24, 2012

(54) GSM AUTHENTICATION IN A CDMA NETWORK

(75) Inventors: Thadi M. Nagaraj, San Diego, CA (US); Bruce Collins, San Diego, CA (US); Nikhil Jain, Mendham, NJ (US)

(73) Assignee: Qualcomm Incorporated, San Diego, CA (US)

( * ) Notice: Subject to any disclaimer, the term of this patent is extended or adjusted under 35 U.S.C. 154(b) by 874 days.

This patent is subject to a terminal disclaimer.

(21) Appl. No.: 11/343,426

(22) Filed: Jan. 30, 2006

(65) Prior Publication Data

US 2007/0180242 A1    Aug. 2, 2007

(51) Int. Cl.
 *H04M 1/68* (2006.01)
(52) U.S. Cl. ........................................ 455/411
(58) Field of Classification Search ............ 455/411, 455/433, 558, 432.1, 435.1, 436, 410, 550.1, 455/439, 412.1, 432.2, 432.3; 370/335, 342, 370/441, 331, 436, 332, 352, 410, 466, 328, 370/333, 337; 380/242, 220, 247; 340/5.21, 340/5.74
See application file for complete search history.

(56) References Cited

U.S. PATENT DOCUMENTS

| | | | |
|---|---|---|---|
| 4,901,307 A | 2/1990 | Gilhousen et al. | |
| 5,675,629 A | 10/1997 | Raffel et al. | |
| 5,862,481 A | 1/1999 | Kulkarni et al. | |
| 5,878,036 A | 3/1999 | Spartz et al. | |
| 5,887,251 A | 3/1999 | Fehnel | |
| 6,144,653 A | 11/2000 | Persson et al. | |
| 6,195,338 B1 | 2/2001 | Decker | |
| 6,223,026 B1 | 4/2001 | Martschitsch | |
| 6,298,232 B1 | 10/2001 | Marin et al. | |
| 6,320,873 B1 | 11/2001 | Nevo et al. | |
| 6,408,173 B1 | 6/2002 | Bertrand et al. | |
| 6,564,055 B1 | 5/2003 | Hronek | |
| 6,584,310 B1 | 6/2003 | Berenzweig | |
| 6,681,111 B2 | 1/2004 | Ahn et al. | |
| 6,839,434 B1 | 1/2005 | Mizikovsky | |
| 6,853,729 B1 | 2/2005 | Mizikovsky | |
| 7,043,238 B2 | 5/2006 | Ahn et al. | |
| 7,110,747 B2* | 9/2006 | Jain et al. | 455/411 |
| 7,155,526 B2 | 12/2006 | Chaudhary et al. | |
| 7,206,576 B2* | 4/2007 | Jain et al. | 455/435.1 |
| 7,343,490 B2 | 3/2008 | Le et al. | |

(Continued)

FOREIGN PATENT DOCUMENTS

AU    2003293525    7/2004

(Continued)

OTHER PUBLICATIONS

Chauhan, Cellular Subscriber Authentication IS-95. Oct. 10, 2001. http://www.geocities.com/rahulsedmapage/Documents/Authentication_slides.pdf.

(Continued)

*Primary Examiner* — Melody Mehrpour
(74) *Attorney, Agent, or Firm* — Stanton Braden

(57) ABSTRACT

Systems and techniques for secured communications from a subscriber station is disclosed. The subscriber station includes a processor having an authentication algorithm for a first network. The processor is configured to use a key for a second network in the authentication algorithm to establish a session with the second network.

55 Claims, 5 Drawing Sheets

U.S. PATENT DOCUMENTS

| | | | |
|---|---|---|---|
| 7,539,491 B2 * | 5/2009 | Jain et al. | 455/435.1 |
| 7,660,417 B2 | 2/2010 | Blom et al. | |
| 7,733,901 B2 * | 6/2010 | Salkini et al. | 370/466 |
| 2001/0044295 A1 | 11/2001 | Saito et al. | |
| 2002/0094811 A1 | 7/2002 | Bright et al. | |
| 2003/0101345 A1 | 5/2003 | Nyberg | |
| 2003/0108007 A1 | 6/2003 | Holcman et al. | |
| 2003/0148791 A1 * | 8/2003 | Ahn et al. | 455/559 |
| 2004/0003056 A1 | 1/2004 | Yamaguchi et al. | |
| 2004/0116155 A1 | 6/2004 | Aisenberg | |
| 2004/0133623 A1 | 7/2004 | Murtagh et al. | |
| 2004/0137899 A1 | 7/2004 | Hartmaier | |
| 2004/0224666 A1 | 11/2004 | Jain et al. | |
| 2004/0224667 A1 | 11/2004 | Jain et al. | |
| 2005/0010692 A1 | 1/2005 | Jain et al. | |
| 2005/0031124 A1 | 2/2005 | Jain et al. | |
| 2005/0096014 A1 | 5/2005 | Jain et al. | |
| 2005/0111666 A1 * | 5/2005 | Blom et al. | 380/277 |
| 2005/0143396 A1 | 6/2005 | Parthasaradhi et al. | |
| 2005/0215245 A1 | 9/2005 | Tian et al. | |
| 2005/0238171 A1 * | 10/2005 | Chen et al. | 380/270 |
| 2006/0050680 A1 | 3/2006 | Naim et al. | |
| 2006/0246949 A1 * | 11/2006 | Gupta et al. | 455/558 |
| 2007/0263586 A1 * | 11/2007 | You et al. | 370/342 |

FOREIGN PATENT DOCUMENTS

| | | |
|---|---|---|
| AU | 2003293525 A1 | 7/2004 |
| CN | 1259811 | 7/2000 |
| EP | 0955783 | 11/1999 |
| EP | 0955783 A2 | 11/1999 |
| EP | 1001570 | 5/2000 |
| EP | 1001570 A2 | 5/2000 |
| EP | 1124401 | 8/2001 |
| EP | 1124401 A2 | 8/2001 |
| EP | 1257143 | 11/2002 |
| EP | 1257143 A1 | 11/2002 |
| JP | 06-500900 | 1/1994 |
| JP | 06500900 | 1/1994 |
| JP | 0669882 | 3/1994 |
| JP | 11513853 | 11/1999 |
| JP | 2000-013873 | 1/2000 |
| JP | 2000013873 A | 1/2000 |
| JP | 2000269959 | 9/2000 |
| JP | 2001005782 | 1/2001 |
| JP | 2001-251292 | 9/2001 |
| JP | 2001251292 A | 9/2001 |
| JP | 2002-320255 | 10/2002 |
| JP | 2002320255 A | 10/2002 |
| JP | 2003078969 A | 3/2003 |
| KR | 19990088046 | 12/1999 |
| RU | 2172077 | 8/2000 |
| RU | 2160975 | 12/2000 |
| RU | 2160975 C2 | 12/2000 |
| WO | 92002087 | 2/1992 |
| WO | WO9202087 | 2/1992 |
| WO | 97015161 | 4/1997 |
| WO | WO9715161 A1 | 4/1997 |
| WO | 00013441 | 3/2000 |
| WO | WO0013441 A2 | 3/2000 |
| WO | 01054435 | 7/2001 |
| WO | WO0154435 A1 | 7/2001 |
| WO | 02041641 | 5/2002 |
| WO | WO0241641 A2 | 5/2002 |
| WO | 2062085 | 8/2002 |
| WO | WO02062085 A2 | 8/2002 |
| WO | WO2004084424 | 9/2004 |

OTHER PUBLICATIONS

Haverinen, et al., "Authentication and Key Generation for Mobile IP using GSM Authentication and Roaming" Communications, 2001. ICC 2001. IEEE International Conference on, vol. 8, Jun. 11-14, 2001, pp. 2453-2457.

Rose, "Authentication and Security in Mobile Phones" Aug. 1999, QUALCOMM Australia, pp. 1-6.

International Search Report and Written Opinion—PCT/US07/061324, International Searching Authority—European Patent Office, Jul. 18, 2007.

Chauhan, "Cellular Subscriber Authentication 15-95. Oct. 10, 2001. http://www.geocities.com/rahulsedmapage/Documents/Authentication_slides.pdf."

International Search Report and Written Opinion—PCT/US2007/061324, International Search Authority—European Patent Office—Jul. 18, 2007.

Taiwanese Search report—096103384—TIPO—Jun. 14, 2010.

Translation of Office Action in Chinese application 200480015359.0 corresponding to U.S. Appl. No. 10/817,196, citing CN1259811 dated Apr. 18, 2011.

* cited by examiner

GSM AUTHENTICATION IN A CDMA NETWORK

BACKGROUND

1. Field

The present disclosure relates generally to wireless telecommunications, and more specifically, to security in wireless communications.

2. Background

Consumer demand for wireless services has led to the development of numerous wireless communication networks. One such network is based on Code-Division Multiple Access (CDMA) technology which supports wireless voice and data services using spread-spectrum processing. Spread-spectrum processing enables high quality service at low cost by efficiently using the available frequency spectrum. As a result, CDMA technology is considered by most to be the way of the future for digital wireless communications.

To provide the widest availability of CDMA technology, certain deployment strategies may be implemented. One such strategy is to introduce CDMA technology as a means for connecting to an existing network infrastructure, such as a Global System for Mobile Communications (GSM). GSM, which has become the de facto standard in Europe and Asia, represents the previous generation of digital wireless communications and utilizes narrowband Time-Division Multiple Access (TDMA) to support wireless voice and data services. By using CDMA as a means for connecting to a GSM network, or other existing networks, reduced cost may be realized because a substantial portion of the existing infrastructure may be used to support CDMA technology.

The introduction of a CDMA into to a GSM network raises a number of security issues. Currently, a GSM network establishes trust and session keys with a GSM subscriber station using a challenge/response procedure. The challenge/response procedure is based on authentication credentials and GSM algorithms stored on a removable Subscriber Identity Module (SIM) in the GSM subscriber station. The removable SIM may be installed on any GSM subscriber station, thereby eliminating the need to provision authentication credentials every time a consumer purchases a new GSM device. Many consumers of GSM products have expressed a certain level of satisfaction with this feature, and therefore, it is desirable to deploy a CDMA subscriber station that can accept a SIM from a GSM subscriber station. This will require that certain compatibility issues be addressed between a CDMA network employing a legacy protocol known as Cellular Authentication and Voice Encryption (CAVE) and a CDMA subscriber station with a GSM SIM.

SUMMARY

An aspect of a subscriber station is disclosed. The subscriber station includes a processor having an authentication algorithm for a first network, the processor further being configured to use a key for a second network in the authentication algorithm to establish a session with the second network.

Another aspect of a subscriber station is disclosed. The subscriber station includes a processor having an authentication algorithm configured to receive a first key for a first network, and a SIM configured to generate a second key for a second network. The processor is further configured to use the second key in place of the first key in the authentication algorithm to establish a session with the second network.

A method of secured communications from a subscriber station is disclosed. The subscriber station has an authentication algorithm for a first network. The method includes generating a key for a second network, and using the key in the authentication algorithm to establish a session with the second network.

Computer readable media embodying a program of instructions executable by a computer to perform a method of secured communications from a subscriber station is disclosed. The subscriber station has an authentication algorithm for a first network. The method includes generating a key for a second network, and using the key in the authentication algorithm to establish a session with the second network.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

In the following detailed description, various encryption techniques will be described in the context of a subscriber station in communication with a GSM core network through a CDMA wireless connection. While these techniques may be well suited for this application, those skilled in the art will readily appreciate that these techniques can be extended to other communication networks co-existing within the same geographic region. Accordingly, any reference to a CDMA or GSM network is intended only to illustrate various inventive aspects of the present invention, with the understanding that these inventive aspects have a wide range of applications.

Figure 1:
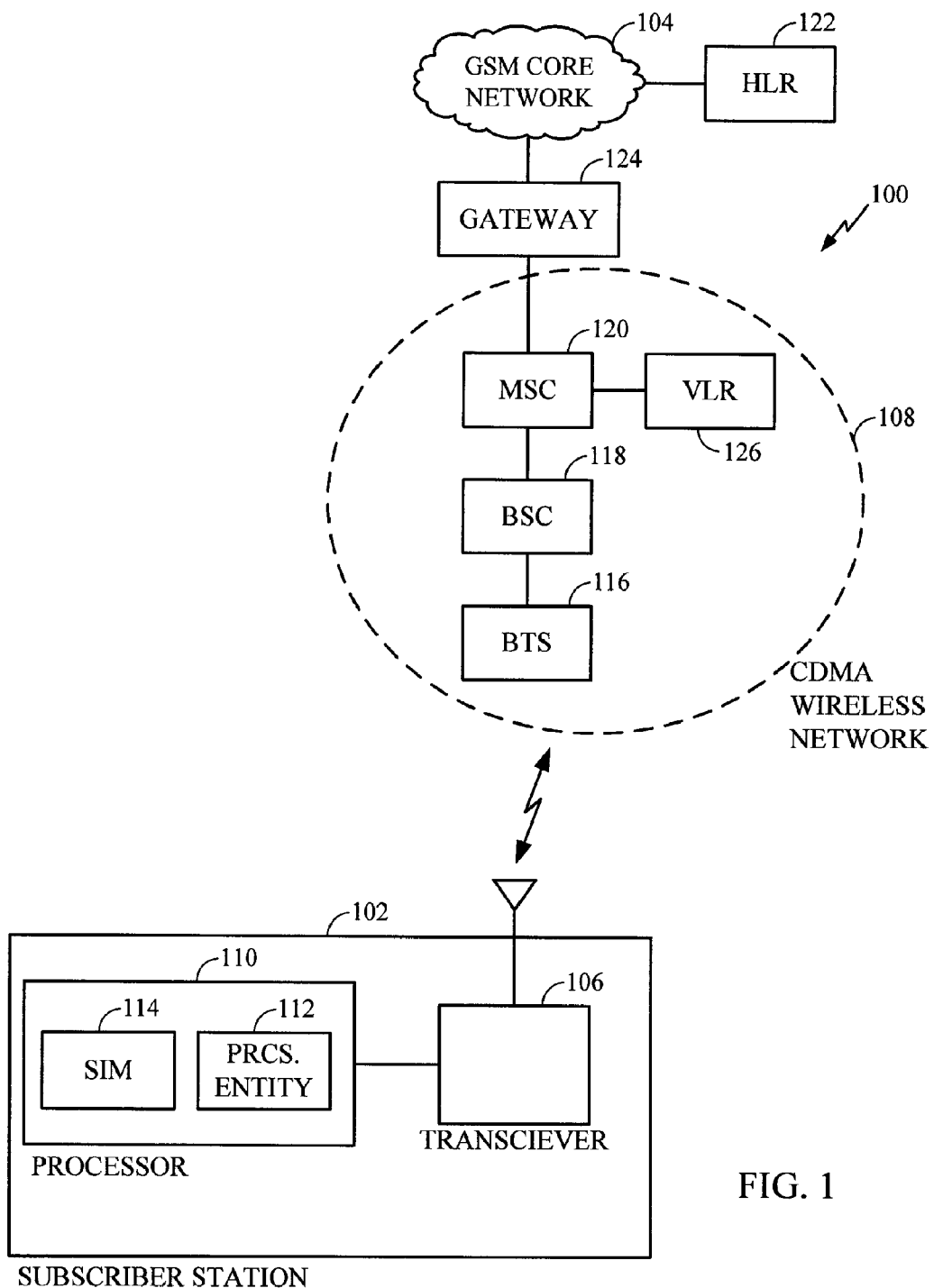
FIG. 1 is a conceptual diagram illustrating an example of a communications system.

FIG. 1 is a conceptual diagram illustrating an example of a communications system 100. In this system, a user on a subscriber station 102 communicates with a GSM core network 104 through a CDMA wireless connection. The subscriber station 102 may be a wireless handset or telephone, a modem, a personal digital assistant (PDA), a laptop computer, a pager, a game console, a camera, an audio or video device, a position determination receiver, or any other suitable wireless communications device. The subscriber station 102 may include a transceiver 106 to support wireless communications with a CDMA network 108. A processor 110 may be used to provide various signal processing functions and user applications. The processor 110 may be a single entity, or any number of processing entities, that provide the functionality required by the subscriber station 102. In at least one embodiment of the subscriber station 102, the processor 110 includes one or more processing entities 112 integrated into the subscriber station 102 and a SIM 114 with its own processor (not shown). The SIM 114 is generally designed to be tamper-resistant and capable of a reasonable level of protection for encryption keys.

The CDMA wireless network 108 is based on a topology in which a geographic coverage region is broken up into cells. Within each of these cells is a fixed Base Transceiver Station (BTS) that provides an air interface to the subscriber stations. A Base Station Controller (BSC) may be used to manage and coordinate the BTSs in the CDMA wireless network 108. For illustrative purposes, a single cell is shown in FIG. 1 with a BTS 116 serving all subscriber stations under control of a BSC 118. A Mobile Switching Center (MSC) 120 may be used to connect the CDMA wireless network 108 to the GSM core network 104.

A GSM Home Location Register (HLR) 122 is used to maintain a record of subscribers for various service providers in the GSM core network 104. For each of these subscribers, the HLR 122 maintains certain information, such as the Electronic Serial Number (ESN), the phone number of the subscriber, the current location of the subscriber station, etc. Typically, the HLR 122 will be coupled with an Authentication Center (AC). The AC is used to authenticate subscribers to the GSM core network 104 and generate session keys for each.

In the embodiment of the communications system 100 shown in FIG. 1, a gateway 124 may be used to interface the MSC 120 in the CDMA wireless network 104 with to the GSM HLR 122. This approach eliminates the need to redesign the MSC 120. In alternative embodiments, the functionality of the gateway 124 could be integrated into the MSC 120. In any event, the gateway 124 is designed to appear to the MSC 120 as a CDMA HLR. This may be achieved by using specific protocols that are well known in the art.

A Visitor Location Register (VLR) 126 is coupled with the MSC 120. The VLR 126 is used to maintain a register of subscriber stations in the CDMA network 104. In the embodiment shown, the VLR 126 basically serves as a local cache of HLR subscriber information from the GSM core network 104. When the subscriber station 102 registers with the MSC 120, the MSC 120 retrieves the subscriber information from the GSM HLR 124 and places it into the VLR 126. The gateway 124 is designed to appear to the MSC 120 as a GSM VLR. This may be achieved by using specific protocols that are well known in the art.

Before describing various security features for a CDMA subscriber station in communication with a GSM core network, the authentication and encryption protocols unique to CDMA and GSM networks will first be described.

Figure 2:
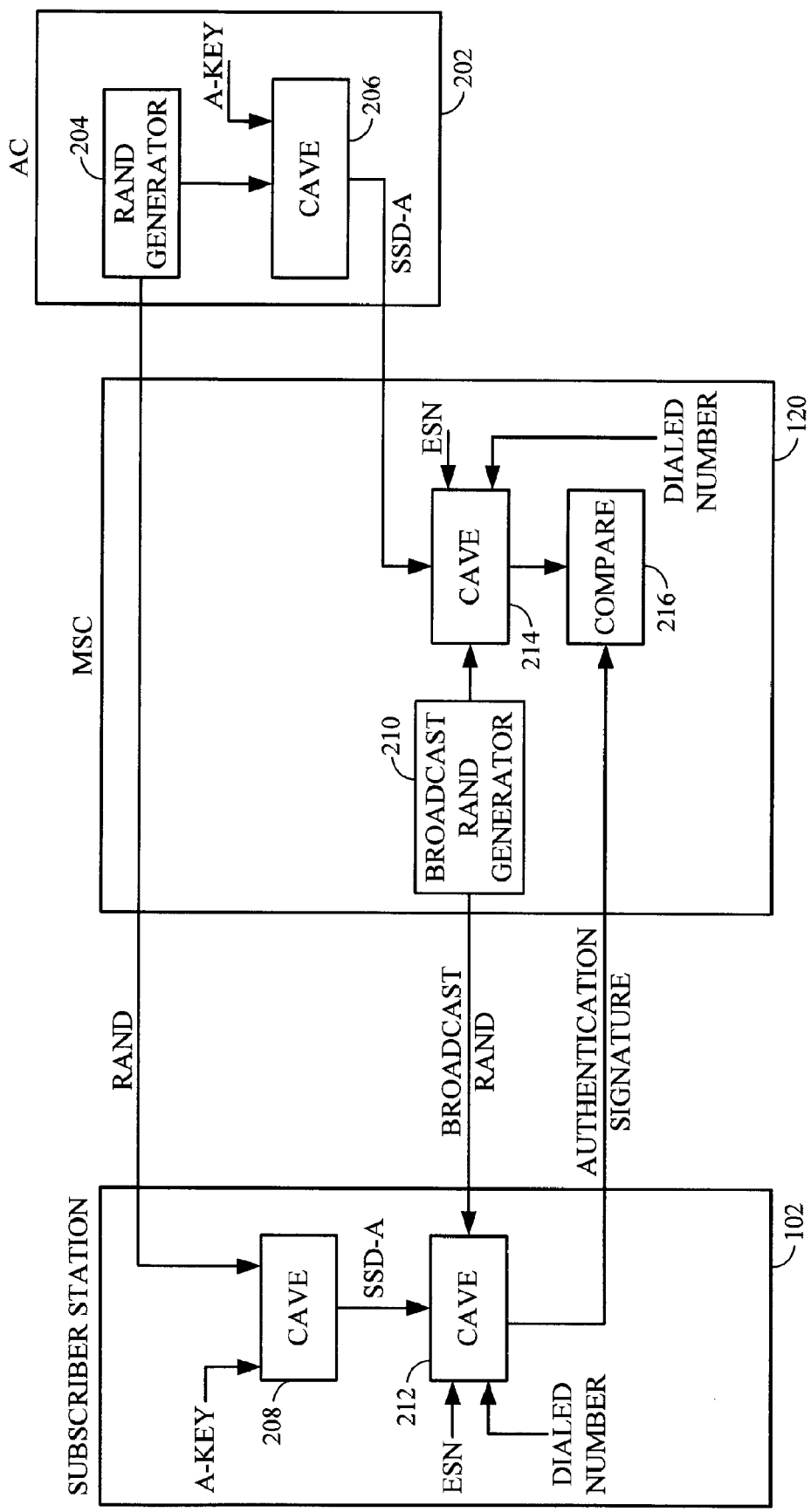
FIG. 2 is a simplified functional block diagram illustrating a standardized CAVE algorithm in a conventional CDMA network.

FIG. 2 is a simplified functional block diagram illustrating a standardized CAVE algorithm in a conventional CDMA network. The security protocols rely on a secret key (A-Key). The A-Key is provisioned into the subscriber station 102 and is stored in the AC 202 of the CDMA network. In addition to authentication, the A-Key is used to generate session keys for voice and data encryption.

When the subscriber station 102 initially registers with the CDMA network, the authentication process begins with the generation of a secondary key called the "Shared Secret Data" key (SSD-A) at the CDMA AC 202 and the subscriber station 102. At the CDMA AC 202, a RAND generator 204 is used to generate a random number (RAND) which, along with the A-key, are input to a CAVE algorithm 206 to generate the SSD-A. The RAND is also sent to the subscriber station 102 so that the SSD-A can be generated there. At the subscriber station 102, the RAND and the A-key are input to a similar CAVE algorithm 208 to generate the SSD-A.

The SSD-A is generally referred to as a "shared secret key" because it is shared between the subscriber station 102 and the MSC 120. Every time a session is initiated, a challenge/response authentication procedure can be used between the subscriber station 102 and the MSC 120 using the SSD-A, without the assistance of the CDMA AC 202. This tends to reduce signaling traffic over the CDMA network. A new SSD-A may be generated at the CDMA AC 202 by sending a RAND to the subscriber station 102, but this generally occurs only after a security breach has been detected or after some predetermined time has expired.

The challenge/response authentication procedure is initiated by the MSC 120 by sending to the subscriber station 102 a random challenge (Broadcast RAND) from a Broadcast RAND generator 210. The subscriber station 102 uses the Broadcast RAND, along with the SSD-A, the ESN, and the telephone number dialed, as inputs to a CAVE algorithm 212 to generate an authentication signature, i.e., a response to the challenge. This signature is then used by the MSC 120 to authenticate the subscriber station 102 by comparing 216 the signature to the output of a similar CAVE algorithm 214 applied to the Broadcast RAND, the SSD-A, the ESN, and the telephone number dialed. The ESN may be retrieved by the MSC 120 from the VLR (see FIG. 1) and the telephone number dialed in sent to the MSC 120 by the subscriber station 102 as part of an exchange of signaling messages to negotiate the session.

Figure 3:
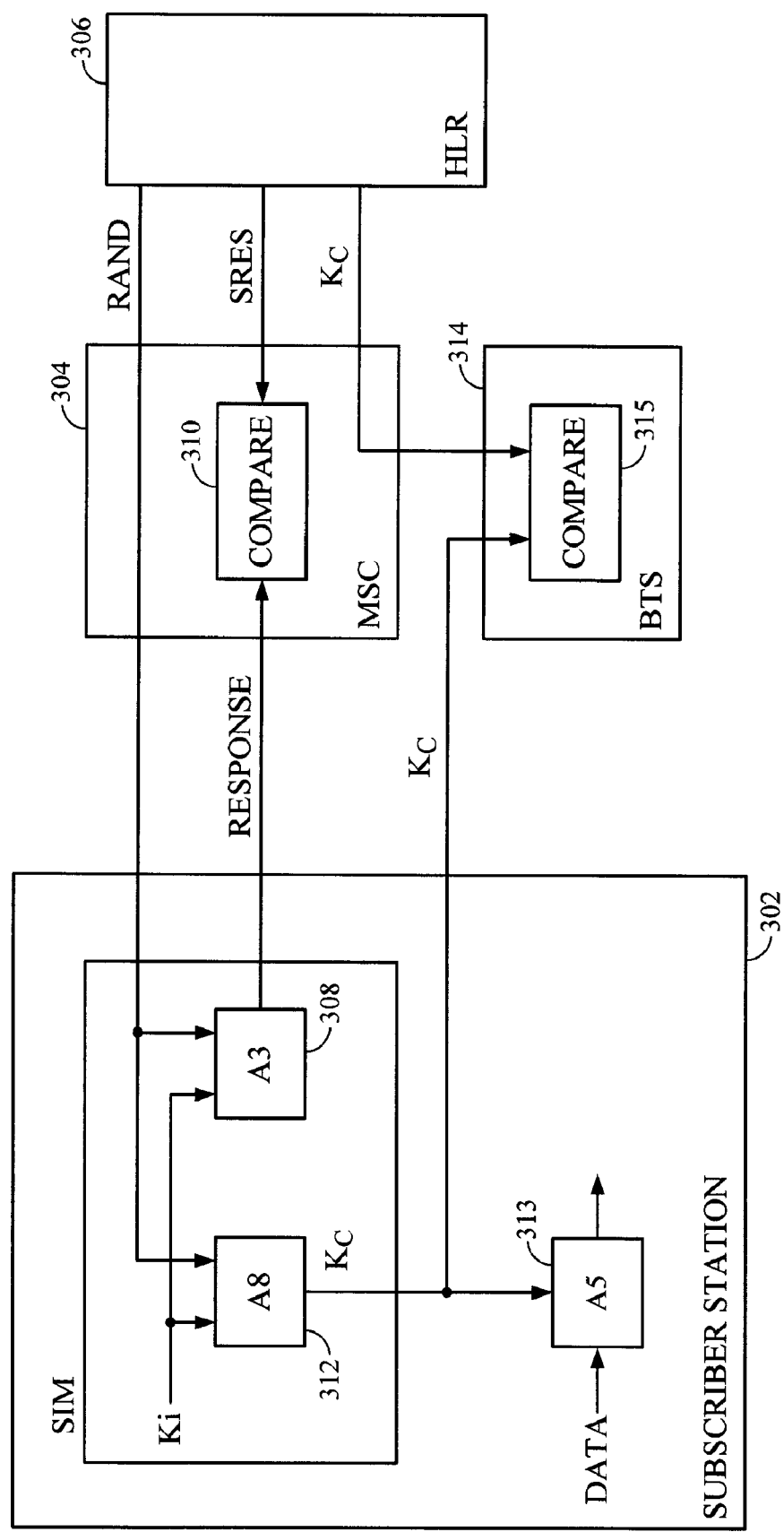
FIG. 3 is a simplified functional block diagram illustrating a standardized GSM authentication algorithm in a conventional GSM network.

FIG. 3 is a simplified functional block diagram illustrating a standardized GSM authentication algorithm in a conventional GSM network. When a GSM subscriber station 302 registers with a GSM MSC 304, the GSM MSC 304 requests a GSM authentication triplet from the GSM HLR 306. The triplet includes a random challenge (RAND), a signed response (SRES), and a ciphering key ($K_C$). The ciphering key ($K_C$) is used as a session key to encrypt communications. The GSM HLR 306 sends the GSM authentication triplet to the MSC 304. The GSM MSC 304 sends the RAND to the GSM subscriber station 302. The GSM subscriber station 302 encrypts the RAND with its individual subscriber authentication key ($K_i$) utilizing an A3 GSM algorithm 308, which is well known in the art. The individual subscriber authentication key ($K_i$) is provisioned into the SIM of the GSM subscriber station 308. The GSM subscriber station 302 sends the encrypted RAND, i.e., signed response, back to the GSM MSC 304 where it is provided to a comparator 310 to be verified against the SRES from the GSM HLR 306.

The GSM subscriber station 302 also uses the individual subscriber authentication key ($K_i$) provisioned into the SIM and the RAND received from the GSM MSC 304 to generate the ciphering key ($K_C$) using an A8 GSM algorithm 312, which is also well known in the art. The ciphering key ($K_C$) generated by the GSM subscriber station 308 is sent to a GSM BTS 314 where it is compared 315 to the ciphering key ($K_C$) received from the GSM MSC 304. The ciphering key ($K_C$) is also used by the GSM subscriber station 302 to encrypt communications with the GSM BTS 314 using an A5 GSM algorithm, which is also well known in the art.

A CDMA subscriber station may be designed to replace a GSM device. The CDMA subscriber station may be configured to accept the SIM from the GSM device, thereby facilitating the transition to CDMA wireless connectivity to GSM core networks. In this configuration, the CDMA subscriber station uses the GSM security credentials on the SIM to establish a secure connection with the GSM core network. Preferably, the authentication process is performed using a challenge/response procedure between the subscriber station and the MSC in the CDMA wireless network. This approach tends to reduce signaling traffic between the CDMA and GSM networks. In at least one embodiment of the communications system, the challenge/response procedure does not require any changes to the CDMA MSC or the GSM core network.

Figure 4:
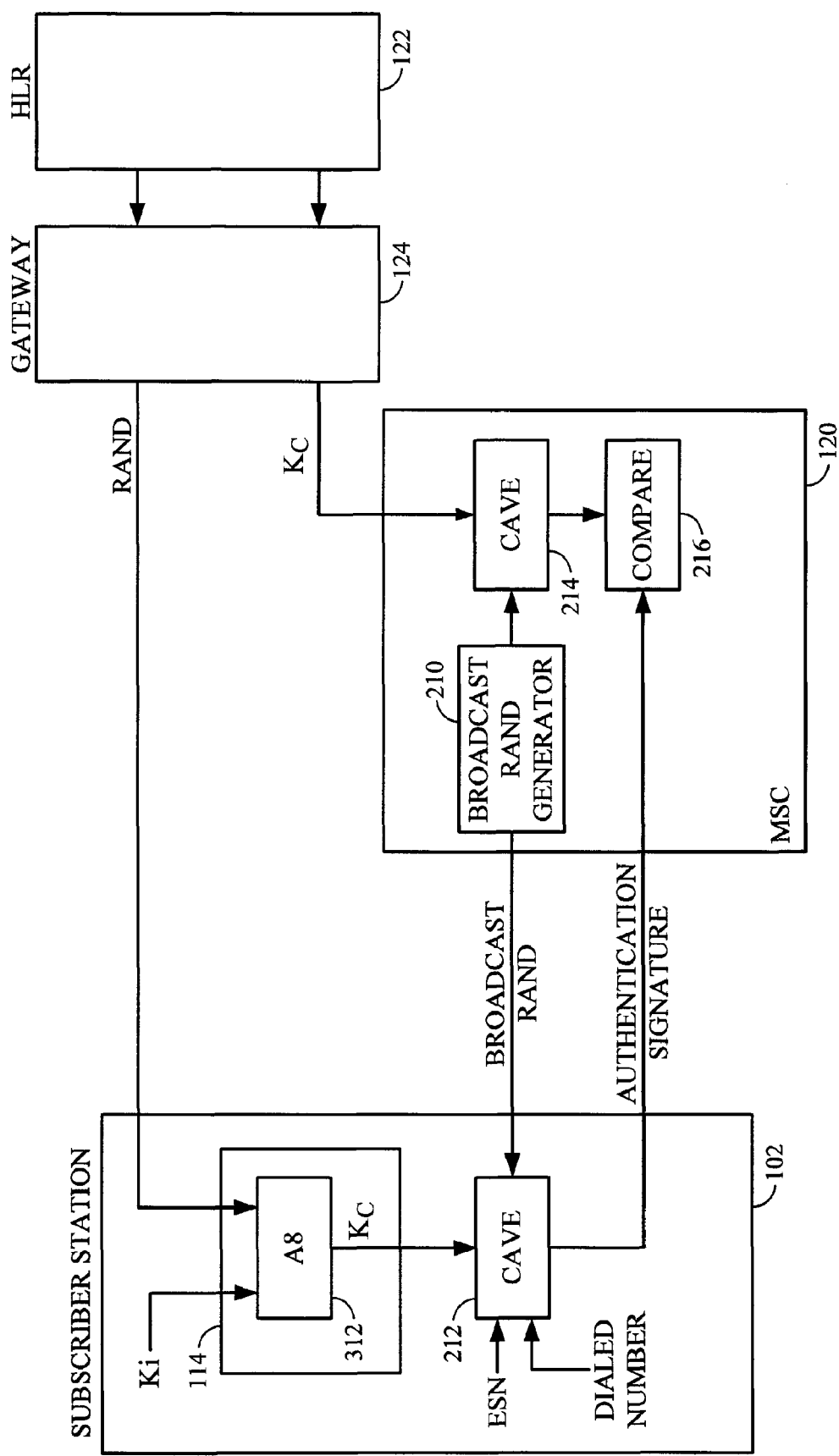
FIG. 4 is a simplified functional block diagram illustrating a methodology for authenticating a CDMA subscriber station in a GSM network.
Figure 5:
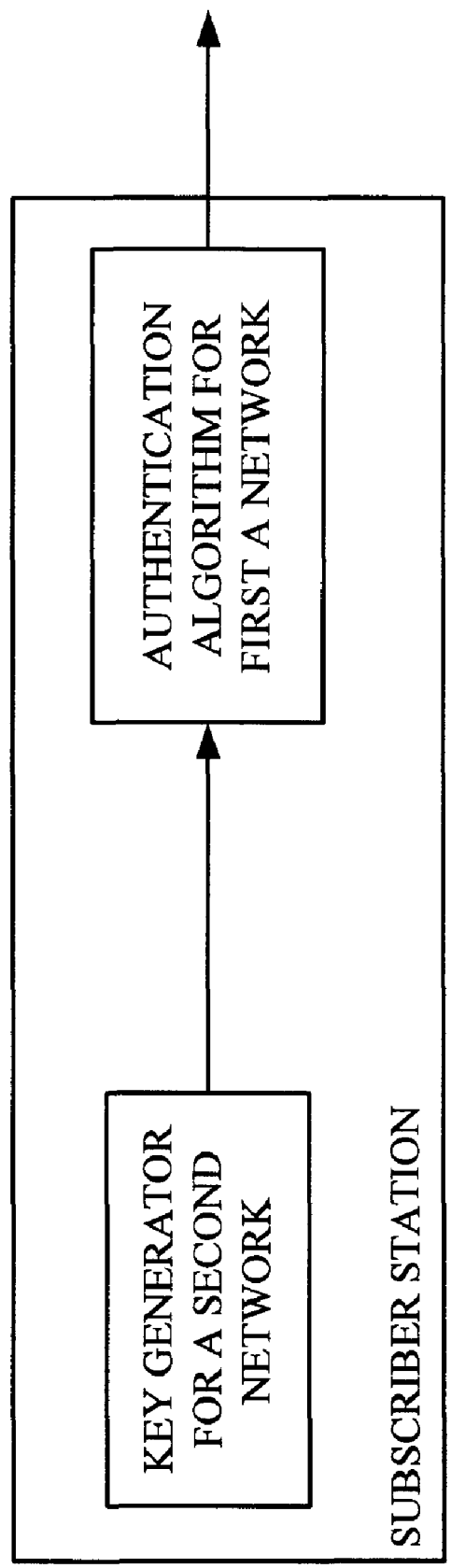
FIG. 5 is a block diagram of an exemplary subscriber station.

A process for authenticating a CDMA subscriber station in a GSM network that meets these objectives will now be described in connection with FIG. 4. The authentication process is based on a shared secret key known to the subscriber station 102 and the CDMA MSC 120, much like the SSD-A in the traditional CDMA network. However, in this embodiment, the shared secret key is the ciphering key ($K_C$), which is part of the triplet generated by the GSM HLR 124. In other words, the ciphering key ($K_C$) generated by the GSM HLR 124 is used by the CDMA wireless network in place of the SSD-A.

The authentication process is performed in two stages. The first stage involves the establishment of the shared secret key, i.e., the ciphering key ($K_C$), between the subscriber station 102 and the CDMA MSC 120. The second stage involves a one-pass challenge/response transaction between the two.

The first stage begins with the registration of the subscriber station 102 with the MSC 120 in the CDMA wireless network 108. The MSC 120 then sends an authentication request to the gateway 124. In response to the authentication request, the gateway 124 retrieves from the GSM HLR 122 subscriber information and a triplet. The triplet includes a ciphering key ($K_C$), a RAND, and an XRES. The gateway 124 stores the subscriber information in the VLR (not shown), and sends the ciphering key ($K_C$) to the MSC 120 and the RAND to the SIM 114. The SIM 114 uses the RAND, along with its individual subscriber authentication key ($K_i$), to generate the ciphering key ($K_C$) using an A8 GSM algorithm 312.

The second stage of the authentication process is performed for each new session established by the subscriber station 102. The process begins at the MSC 120 by sending to the subscriber station 102 a random challenge (Broadcast RAND) from a Broadcast RAND generator 210. The subscriber station 102 uses the Broadcast RAND, along with the ciphering key ($K_C$) computed on the SIM 114, the ESN, and the telephone number dialed, as inputs to a CAVE algorithm 212 to generate an authentication signature, i.e., a response to the challenge. This signature is then used by the MSC 120 to authenticate the subscriber station 102 by comparing 216 the signature to the output of a similar CAVE algorithm 214 applied to the Broadcast RAND, the ciphering key ($K_C$), the ESN, and the telephone number dialed. The ESN may be retrieved by the MSC 120 from the VLR (not shown) and the telephone number dialed is sent to the MSC 120 by the subscriber station 102 as part of an exchange of signaling messages to negotiate the session.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A subscriber station, comprising:
   a processor having an authentication algorithm for a Code Division Multiple Access (CDMA) network, the processor further being configured to use a key for a Global System for Mobile Communications (GSM) network in the authentication algorithm for the CDMA network to establish a session with the GSM network.

2. The subscriber station of claim 1 wherein the processor is further configured to establish a session with the second network through a wireless connection with the first network.

3. The subscriber station of claim 1 wherein the processor is further configured to generate the key from a different key provisioned in the subscriber station.

4. The subscriber station of claim 3 wherein the processor further comprises a Subscriber Identity Module (SIM), the different key being provisioned on the SIM.

5. The subscriber station of claim 3 wherein the key is a ciphering key ($K_C$) and the different key provisioned on the SIM is an individual subscriber authentication key ($K_i$), and wherein the processor is further configured to generate the ciphering key ($K_C$) from the individual subscriber authentication key ($K_i$) using a GSM algorithm.

6. The subscriber station of claim 5 wherein the processor is further configured to generate the ciphering key ($K_C$) from the individual subscriber authentication key ($K_i$) and a random number from a home location register in the GSM network.

7. The subscriber station of claim 5 wherein the algorithm is a Cellular Authentication and Voice Encryption (CAVE) algorithm, the key is a ciphering key ($K_C$), and the different key provisioned on the SIM is an individual subscriber authentication key ($K_i$).

8. The subscriber station of claim 7 wherein the processor is further configured to use the ciphering key ($K_C$) in place of a shared secret key (SSD-A) in the CAVE algorithm.

9. The subscriber station of claim 1 wherein the processor is further configured to initiate the authentication algorithm in response to a challenge from a service provider in the first network.

10. The subscriber station of claim 9 wherein the processor is further configured to generate a response to the challenge, the response being generated by applying the key and the challenge to the algorithm.

11. The subscriber station of claim 10 wherein the first network is a Code Division Multiple Access (CDMA) network, and the algorithm is a Cellular Authentication and Voice Encryption (CAVE) algorithm.

12. The subscriber station of claim 11 wherein the response is generated by also applying a subscriber station identification number and a dialed number to the CAVE algorithm.

13. A subscriber station, comprising:
a processor having an authentication algorithm for a Code Division Multiple Access (CDMA) network and configured to receive a first key for the CDMA network, and a Subscriber Identity Module (SIM) configured to generate a second key for a Global System for Mobile Communications (GSM) network, the processor further being configured to use the second key in place of the first key in the authentication algorithm for the CDMA network to establish a session with the GSM network.

14. The subscriber station of claim 13 wherein the processor is further configured to establish a session with the second network through a wireless connection with the first network.

15. The subscriber station of claim 13 wherein the algorithm is a Cellular Authentication and Voice Encryption (CAVE) algorithm, the first key is key is a shared secret key (SSD-A), and the second key is a ciphering key ($K_C$).

16. The subscriber station of claim 15 wherein the SIM is configured to generate the ciphering key ($K_C$) from an individual subscriber authentication key ($K_i$) provisioned in the SIM.

17. The subscriber station of claim 16 wherein the SIM is configured to generate the ciphering key ($K_C$) from the individual subscriber authentication key ($K_i$) using a GSM algorithm.

18. The subscriber station of claim 17 wherein the SIM is further configured to generate the ciphering key ($K_C$) from the individual subscriber authentication key ($K_i$) and a random number from a home location register in the GSM network.

19. The subscriber station of claim 13 wherein the processor is further configured to initiate the authentication algorithm in response to a challenge from a service provider in the first network.

20. The subscriber station of claim 19 wherein the processor is further configured to generate a response to the challenge, the response being generated by applying the second key and the challenge to the algorithm.

21. The subscriber station of claim 20 wherein the first network is a Code Division Multiple Access (CDMA) network, and the algorithm is a Cellular Authentication and Voice Encryption (CAVE) algorithm.

22. The subscriber station of claim 21 wherein the response is generated by also applying a subscriber station identification number and a dialed number to the CAVE algorithm.

23. A method of secured communications from a subscriber station having an authentication algorithm for a Code Division Multiple Access (CDMA) network, comprising:
generating a key for a Global System for Mobile Communications (GSM) network; and
using the key in the authentication algorithm for the CDMA network to establish a session with the GSM network.

24. The method of claim 23 wherein the session with the second network is established through a wireless connection with the first network.

25. The method of claim 23 wherein the first network is a Code Division Multiple Access (CDMA) network, the second network is a Global System for Mobile Communications (GSM) network, and the key is a ciphering key ($K_C$), and wherein the generation of the ciphering key ($K_C$) comprises applying an individual subscriber authentication key ($K_i$) to a GSM algorithm.

26. The method of claim 23 wherein the key is a ciphering key ($K_C$), and the algorithm is a Cellular Authentication and Voice Encryption (CAVE) algorithm configured to receive a SSD-A, and wherein the ciphering key ($K_C$) is used in place of a shared secret key (SSD-A) in the CAVE algorithm.

27. The method of claim 23 wherein the key is used in the algorithm to establish a session with the second network in response to a challenge from a service provider in the first network.

28. An apparatus, comprising:
means for generating a key for a Global System for Mobile Communications (GSM) network; and
means for using the key in an authentication algorithm for a Code Division Multiple Access (CDMA) network to establish a session with the GSM network.

29. A computer program product for secured communications from a subscriber station comprising:
a non-transitory computer-readable medium, comprising:
at least one instruction for causing a computer to generate a key for a Global System for Mobile Communications (GSM) network; and
at least one instruction for causing the computer to use the key in an authentication algorithm for a Code Division Multiple Access (CDMA) network to establish a session with the GSM network.

30. The apparatus of claim 28 wherein the session with the second network is established through a wireless connection with the first network.

31. The apparatus of claim 28 wherein the key is a ciphering key ($K_C$), and wherein the means for generating the ciphering key ($K_C$) comprises means for applying an individual subscriber authentication key ($K_i$) to a GSM algorithm.

32. The apparatus of claim 28 wherein the key is a ciphering key ($K_C$), and the algorithm is a Cellular Authentication and Voice Encryption (CAVE) algorithm configured to receive a SSD-A, and wherein the ciphering key ($K_C$) is used in place of a shared secret key (SSD-A) in the CAVE algorithm.

33. The apparatus of claim 28 wherein the key is used in the algorithm to establish a session with the second network in response to a challenge from a service provider in the first network.

34. The computer program product of claim 29 wherein the session with the second network is established through a wireless connection with the first network.

35. The computer program product of claim 29 wherein the key is a ciphering key ($K_C$), and wherein the generation of the ciphering key ($K_C$) comprises applying an individual subscriber authentication key ($K_i$) to a GSM algorithm.

36. The computer program product of claim 29 wherein the key is a ciphering key ($K_C$), and the algorithm is a Cellular Authentication and Voice Encryption (CAVE) algorithm configured to receive a SSD-A, and wherein the ciphering key ($K_C$) is used in place of a shared secret key (SSD-A) in the CAVE algorithm.

37. The computer program product of claim 29 wherein the key is used in the algorithm to establish a session with the second network in response to a challenge from a service provider in the first network.

38. A method of secured communications from a subscriber station having an authentication algorithm for a Code Division Multiple Access (CDMA) network, comprising:
receiving a first key for the CDMA network;
generating a second key for a Global System for Mobile Communications (GSM) network; and
using the second key in place of the first key in the authentication algorithm for the CDMA network to establish a session with the GSM network.

39. The method of claim 38 further comprising:
establishing a session with the second network through a wireless connection with the first network.

40. The method of claim 38 wherein the algorithm is a Cellular Authentication and Voice Encryption (CAVE) algorithm, the first key is key is a shared secret key (SSD-A), and the second key is a ciphering key ($K_C$).

41. The method of claim 40, further comprising:
generating, via the SIM, the ciphering key ($K_C$) from an individual subscriber authentication key ($K_i$) provisioned in the SIM.

42. The method of claim 41, further comprising:
generating, via the SIM, the ciphering key ($K_C$) from the individual subscriber authentication key ($K_i$) using a GSM algorithm.

43. The method of claim 42, further comprising:
generating, via the SIM, the ciphering key ($K_C$) from the individual subscriber authentication key ($K_i$) and a random number from a home location register in the GSM network.

44. The method of claim 38, further comprising:
initiating the authentication algorithm in response to a challenge from a service provider in the first network.

45. The method of claim 44, further comprising:
generating a response to the challenge, the response being generated by applying the second key and the challenge to the algorithm.

46. The method of claim 45 wherein the first network is a Code Division Multiple Access (CDMA) network, and the algorithm is a Cellular Authentication and Voice Encryption (CAVE) algorithm.

47. The method of claim 46 wherein the response is generated by also applying a subscriber station identification number and a dialed number to the CAVE algorithm.

48. An apparatus for secured communications from a subscriber station having an authentication algorithm for a Code Division Multiple Access (CDMA) network, comprising:
means for receiving a first key for the CDMA network;
means for generating a second key for a Global System for Mobile Communications (GSM) network; and
means for using the second key in place of the first key in the authentication algorithm for the CDMA network to establish a session with the GSM network.

49. The apparatus of claim 48, further comprising:
means for establishing a session with the second network through a wireless connection with the first network.

50. The apparatus of claim 48, further comprising:
means for initiating the authentication algorithm in response to a challenge from a service provider in the first network.

51. The method of claim 50, further comprising:
means for generating a response to the challenge, the response being generated by applying the second key and the challenge to the algorithm.

52. A non-transitory computer readable media for secured communications from a subscriber station having an authentication algorithm for a Code Division Multiple Access (CDMA) network, comprising:
a non-transitory computer-readable medium comprising:
at least one instruction for causing a computer to receive a first key for the CDMA network;
at least one instruction for causing the computer to generate a second key for a Global System for Mobile Communications (GSM) network; and
at least one instruction for causing the computer to use the second key in place of the first key in the authentication algorithm for the CDMA network to establish a session with the GSM network.

53. The non-transitory computer readable media of claim 52, further comprising:
at least one instruction for causing the computer to establish a session with the second network through a wireless connection with the first network.

54. The non-transitory computer readable media of claim 52, further comprising:
at least one instruction for causing the computer to initiate the authentication algorithm in response to a challenge from a service provider in the first network.

55. The non-transitory computer readable media of claim 54, further comprising:
at least one instruction for causing the computer to generate a response to the challenge, the response being generated by applying the second key and the challenge to the algorithm.

* * * * *